(12) United States Patent
Liang

(10) Patent No.: US 12,107,452 B2
(45) Date of Patent: Oct. 1, 2024

(54) CHARGING CIRCUIT, CHARGING CONTROL METHOD AND ELECTRONIC DEVICE

(71) Applicant: BEIJING XIAOMI MOBILE SOFTWARE CO., LTD., Beijing (CN)

(72) Inventor: Lei Liang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 329 days.

(21) Appl. No.: 17/514,422

(22) Filed: Oct. 29, 2021

(65) Prior Publication Data

US 2022/0385094 A1 Dec. 1, 2022

(30) Foreign Application Priority Data

May 26, 2021 (CN) .......................... 202110578704.7

(51) Int. Cl.
H02J 7/04 (2006.01)
H02J 7/00 (2006.01)

(52) U.S. Cl.
CPC ...... *H02J 7/007192* (2020.01); *H02J 7/0029* (2013.01); *H02J 7/007182* (2020.01)

(58) Field of Classification Search
None
See application file for complete search history.

(56) References Cited

U.S. PATENT DOCUMENTS

| 8,907,631 | B1 | 12/2014 | Gurries et al. | |
|---|---|---|---|---|
| 9,766,292 | B2 | 9/2017 | Hirose et al. | |
| 2002/0167295 | A1* | 11/2002 | Yamashita | H02J 7/007194 320/150 |
| 2017/0215484 | A1* | 8/2017 | Xiang | H02J 7/007182 |
| 2018/0034305 | A1 | 2/2018 | Lee et al. | |
| 2021/0036533 | A1 | 2/2021 | Sporck et al. | |
| 2021/0119487 | A1 | 4/2021 | Choi et al. | |

FOREIGN PATENT DOCUMENTS

| CN | 202190108 U | 4/2012 |
|---|---|---|
| CN | 106684963 A | 5/2017 |
| CN | 107077181 A | 8/2017 |
| CN | 107706940 B | 2/2020 |

(Continued)

OTHER PUBLICATIONS

Indian Patent Application No. 202144051735, Office Action dated Dec. 30, 2022, 6 pages.

(Continued)

*Primary Examiner* — Arun C Williams
(74) *Attorney, Agent, or Firm* — Cozen O'Connor

(57) ABSTRACT

A charging circuit includes at least two charging chips for charging a battery of an electronic device. Each of the at least two charging chips is configured to operate in an independent charging mode. Each charging chip includes a first voltage sampling end and a second voltage sampling end for collecting voltage information of the battery, and each charging chip is configured for independent charging according to the collected voltage information. The first voltage sampling end and the second voltage sampling end are respectively connected to two poles of the battery.

15 Claims, 3 Drawing Sheets

(56) References Cited

FOREIGN PATENT DOCUMENTS

| | | | |
|---|---|---|---|
| CN | 112104243 A | 12/2020 |
| CN | 112737022 A | 4/2021 |

OTHER PUBLICATIONS

European Patent Application No. 21207268.0, Search and Opinion dated May 2, 2022, 8 pages.
Chinese Patent Application No. 202110578704.7, Office Action dated Jun. 14, 2024, 5 pages.
Chinese Patent Application No. 202110578704.7, English translation of Office Action dated Jun. 14, 2024, 9 pages.

* cited by examiner

CHARGING CIRCUIT, CHARGING CONTROL METHOD AND ELECTRONIC DEVICE

CROSS REFERENCE TO RELATED APPLICATION

This Application claims the benefit of priority to Chinese Application No. 202110578704.7, filed on May 26, 2021, the content of which is incorporated herein by reference in its entirety.

TECHNICAL FIELD

The present disclosure relates to a field of electronic device technologies, and more particularly, to a charging circuit, a charging control method and an electronic device.

BACKGROUND

With increasing requirements for greater charging power of electronic devices such as mobile phones, an electronic device may use two or more charging chips. The use of two or more charging chips may improve charging power and minimize increasing temperature while charging. Many different layouts and connection modes between multiple charging chips are possible, and these configurations may have a large impact on a charging strategy and performance.

SUMMARY

In a first aspect, embodiments of the present disclosure provide a charging circuit. The charging circuit includes at least two charging chips for charging a battery. Each of the at least two charging chips is configured to operate in an independent charging mode. Each charging chip includes a first voltage sampling end and a second voltage sampling end for collecting voltage information of the battery, and each charging chip is configured for independent charging according to the collected voltage information. The first voltage sampling end and the second voltage sampling end are respectively connected to two poles of the battery.

In a second accept, embodiments of the present disclosure provide an electronic device. The electronic device includes a battery and at least two charging chips for charging the battery. Each of the at least two charging chips is configured to operate in an independent charging mode. Each charging chip includes a first voltage sampling end and a second voltage sampling end for collecting voltage information of the battery, and each charging chip is configured for independent charging according to the collected voltage information. The first voltage sampling end and the second voltage sampling end are respectively connected to two poles of the battery.

In a third accept, embodiments of the present disclosure provide a charging control method, applicable for an electronic device including a battery and at least two charging chips for charging the battery, wherein each of the at least two charging chips is configured to operate in an independent charging mode. The control method includes: determining at least one of an operating state of the electronic device and a running state of an application running on the electronic device; adjusting a charging mode of each of at least two charging chips according to at least one of the operating state of the electronic device and the running state of the application running on the electronic device, and controlling the operation or turn-off of each charging chip.

It should be understood that the above general description and the following detailed description are only exemplary and explanatory, and do not limit the present disclosure.

DETAILED DESCRIPTION

The present disclosure will be described in detail below in combination with embodiments shown in the accompanying drawings. However, these embodiments do not limit the present disclosure, and the structural, method, or functional changes made by those skilled in the art according to these embodiments are included in the scope of protection of the present disclosure.

Terms used in the present disclosure are merely for a purpose of describing specific embodiments, but are not to limit the present disclosure. The singular forms "a," and "the" in the description and claims of the present disclosure are also intended to include the majority form unless the context clearly indicates other meanings. It should also be understood that the term "and/or" used herein refers to and includes any or all possible combinations of one or more associated listed items.

A charging circuit, a charging control method and an electronic device of the present disclosure are described in detail below in combination with the accompanying drawings. Without conflict, features in the following embodiments and implements may be combined with each other.

Figure 1:
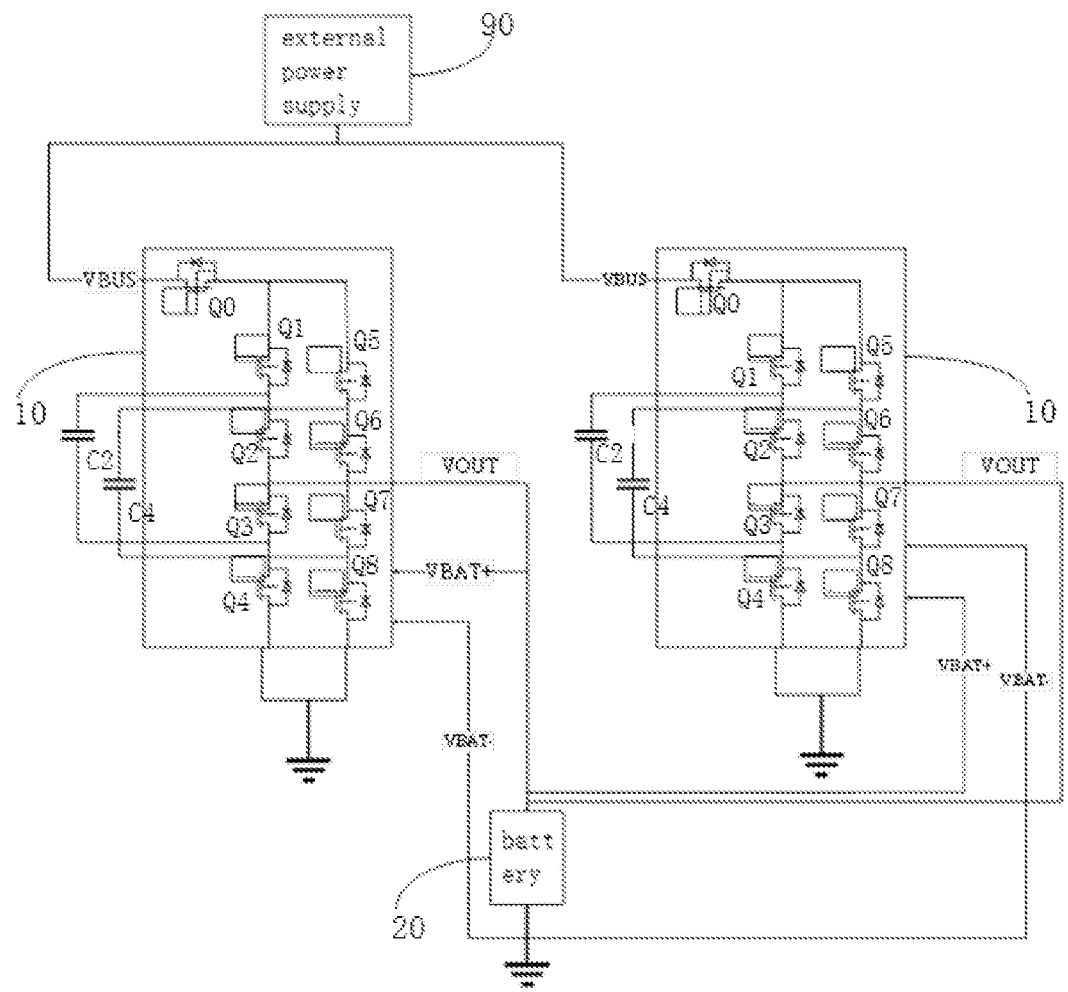
FIG. 1 is a schematic diagram of a charging circuit according to an embodiment of the present disclosure.

Referring to FIG. 1, embodiments of the present disclosure provide a charging circuit. The charging circuit includes at least two charging chips 10 for charging a battery of an electronic device. The charging chip 10 may be understood as a charge pump. Each of the at least two charging chips 10 is configured to operate in an independent charging mode. "Multiple" or "a plurality of" described in the present disclosure refers to two or more. In some embodiments, the number of the charging chips 10 may be two. The accompanying drawings take two charging chips 10 as an example.

In the present disclosure, each charging chip 10 may be configured to operate in the independent charging mode based on the charging circuit including respective charging chips 10. For example, when the electronic device is powered on, a CPU may configure each charging chip 10 to operate in the independent charging mode, and then each charging chip 10 may collect voltage information and preform charging independently.

Each charging chip 10 includes a first voltage sampling end VBAT+ and a second voltage sampling end VBAT− for collecting voltage information of the battery 20, and each charging chip 10 is configured for independent charging according to the collected voltage information. The first voltage sampling end VBAT+ and the second voltage sampling end VBAT− are respectively connected to two poles of the battery 20.

In the charging circuit of FIG. 1, each charging chip 10 is configured to operate in the independent charging mode, which may independently collect the voltage information of the battery 20 through the first voltage sampling end VBAT+ and the second voltage sampling end VBAT−, and each charging chip 10 may operate independently according to the collected voltage information without affecting each other. Any charging chip 10 may be flexibly turned off according to different scenarios, and more charging scenarios may be applied. For example, taking two charging chips as an example, when the electronic device is powered on, the CPU of the electronic device configures both of the two charging chips to operate in the independent charging mode, and then the two charging chips may collect voltage information for independent charging. The two do not affect each other, rather than a master-slave mode. Therefore, the electronic device may selectively turn off any charging chip according to different operation modes or a heating condition of the whole machine, which may meet different charging scenarios.

In some embodiments, each charging chip 10 includes a voltage input wire VBUS and a voltage output wire VOUT, the voltage input wire VBUS is configured for connecting with an external power supply 90, and the voltage output wire VOUT is configured for connecting with the battery 20. Each charging chip 10 includes a first switch tube Q0 and at least one charging path, each charging path is provided with a capacitor, which may be a capacitor for charging or discharging. Each charging path is formed by a plurality of switch tubes connected in series. A first end of each charging path is connected to a first end (a right end shown in the figure) of the first switch tube Q0, and a second end of each charging path is grounded. The voltage input wire VBUS is connected to a second end (a left end shown in the figure) of the first switch tube Q0, and the voltage output wire VOUT is connected to a node formed between any two switch tubes of each charging path. With the above settings, the external power supply may charge the capacitor through the charging path. After the capacitor is fully charged, the battery 20 may be charged by the capacitor as standby power without connecting with the external power supply, so as to prolong a standby time of the electronic device.

In the example shown in the figure, at least one charging path, taking two as examples, may include a first charging path and a second charging path. The first charging path is provided with a first capacitor C2 and the second charging path is provided with a second capacitor C4. The first charging path includes a second switch tube Q1, a third switch tube Q2, a fourth switch tube Q3 and a fifth switch tube Q4 connected in series successively, and the second charging path includes a sixth switch tube Q5, a seventh switch tube Q6, an eighth switch tube Q7 and a ninth switch Q8 tube connected in series successively.

A first end (an upper end shown in the figure) of the first capacitor C2 is connected to a node formed between the second switch tube Q1 and the third switch tube Q2, and a second end (a lower end shown in the figure) of the first capacitor C2 is connected to a node formed between the fourth switch tube Q3 and the fifth switch tube Q4. A first end (an upper end shown in the figure) of the second capacitor C4 is connected to a node formed between the sixth switch tube Q5 and the seventh switch tube Q6, and a second end (a lower end shown in the figure) of the second capacitor C4 is connected to a node formed between the eighth switch tube Q7 and the ninth switch tube Q8. The voltage output wire VOUT is connected to a node formed between the third switch tube Q2 and the fourth switch tube Q3 and a node formed between the seventh switch tube Q6 and the eighth switch tube Q7.

With the above setting, the external power supply may charge the first capacitor C2 via the first charging wire and charge the second capacitor C4 through the second charging wire. After the first capacitor C2 and the second capacitor C4 both are fully charged, the battery 20 may be charged by the first capacitor C2 and the second capacitor C4 as standby powers without external power supply, which may prolong the standby time of the electronic device.

Continuing to refer to FIG. 1, embodiments of the present disclosure also provide an electronic device, which may be a mobile terminal such as a mobile phone, a tablet, etc. The electronic device may include a battery 20 and a charging circuit. It should be noted that the description of the charging circuit in the above embodiments and implements is also applicable for the electronic device of the present embodiment. A positive pole of the battery 20 is connected to the voltage output wire VOUT of the charging chips 10 of the charging circuit, and a negative pole of the battery 20 is grounded.

In the charging circuit, each charging chip 10 is configured to operate in an independent charging mode, which may independently connect with the external power supply 90 and the battery 20, and independently collect the voltage information of the battery 20 through the first voltage sampling end VBAT+ and the second voltage sampling end VBAT−. Each charging chip 10 may operate independently according to the collected voltage information without affecting each other. The electronic device may flexibly turn off any charging chip 10 according to different scenarios, and more charging scenarios may be applied. For example, taking two charging chips as an example, when the electronic device is powered on, the CPU of the electronic device configures both of the two charging chips to operate in the independent charging mode, and then the two charging chips may respectively collect voltage information for independent charging. The two charging chips do not affect each other. Therefore, the electronic device may selectively turn off any charging chip according to different operation modes or the heating condition of the whole machine, which may meet more different charging scenarios.

In some embodiments, the electronic device may include at least one mainboard. When the electronic device includes one mainboard, the respective charging chips 10 are provided on the mainboard.

When the electronic device includes at least two mainboards, the respective charging chips 10 may be provided on a same mainboard in the at least two mainboards. Taking two mainboards including a large board and a small board as an example, the respective charging chips may be provided on the large board. Both charging chips are provided on the same mainboard. In this way, it is easier to control charging current through wiring impedance.

When the electronic device includes at least two mainboards, each mainboard is provided with at least one charging chip 10. Taking two mainboards and two charging chips as an example, the two mainboards include the large board and the small board, and the large board is provided with one charging chip, and the small board is provided with the other charging chip.

Such layout leads to dispersion of heat sources, which is easy to improve charging performances, and corresponding settings are made on the wiring impedance, so as to achieve a balance of current distribution between the two charging chips.

Because each charging chip is arranged independently, a position of each charging chip may be flexibly set according to an actual number and layout of the mainboard. And each charging chip may independently detect the voltage information of the battery for charging. In a case that it is not required such a large charging current, any charging chip may be turned off, or the charging chip in the area with a high temperature is turned off according to the heating condition of the mainboard. In this way, the position of the charging chip may be flexibly arranged, and the layout of the mainboard may also be flexibly adjusted and have diversity.

Figure 2:
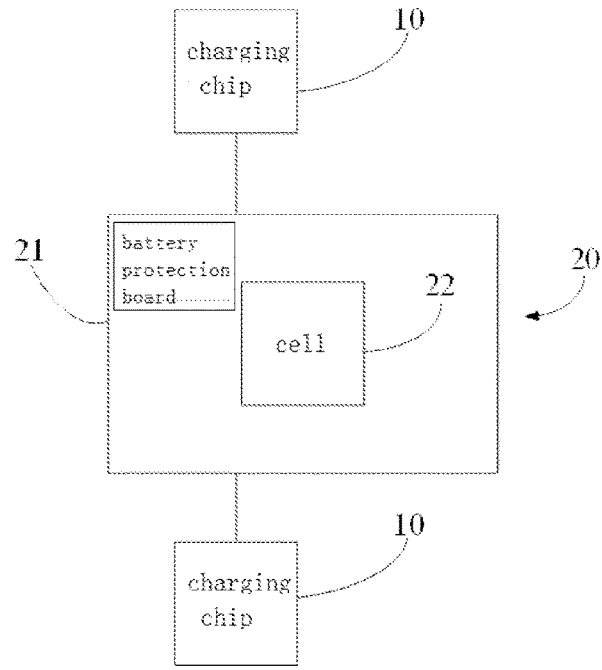
FIG. 2 is a block diagram of an electronic device according to an embodiment of the present disclosure.

As illustrated in FIG. 2, in some embodiments, the battery 20 includes a battery protection board 21 and a cell 22 provided on the battery protection board 21, and the battery protection board 21 is provided with connecting wires for connecting with the voltage output wires VOUT. The voltage output wires VOUT of the charging chips 10 are connected to the battery protection board 21 through the connecting wires, so as to charge the cell 22. In FIG. 2, there are two mainboards, including a large board and a small board, for example, the large board is located on one side of the battery, and the small board is located on the other side of the battery. And each of the large board and the small board is provided with one charging chip, so the two charging chips 10 are respectively located on the upper and lower sides of the battery protection board 21. Since the charging chips 10 of the present disclosure are independently arranged, the positions of the two charging chips 10 may be arranged according to the position of the mainboards, which may make the layout of the mainboards more flexible, or may be arranged according to the actual requirements, which will not be limited in the present disclosure.

Figure 3:
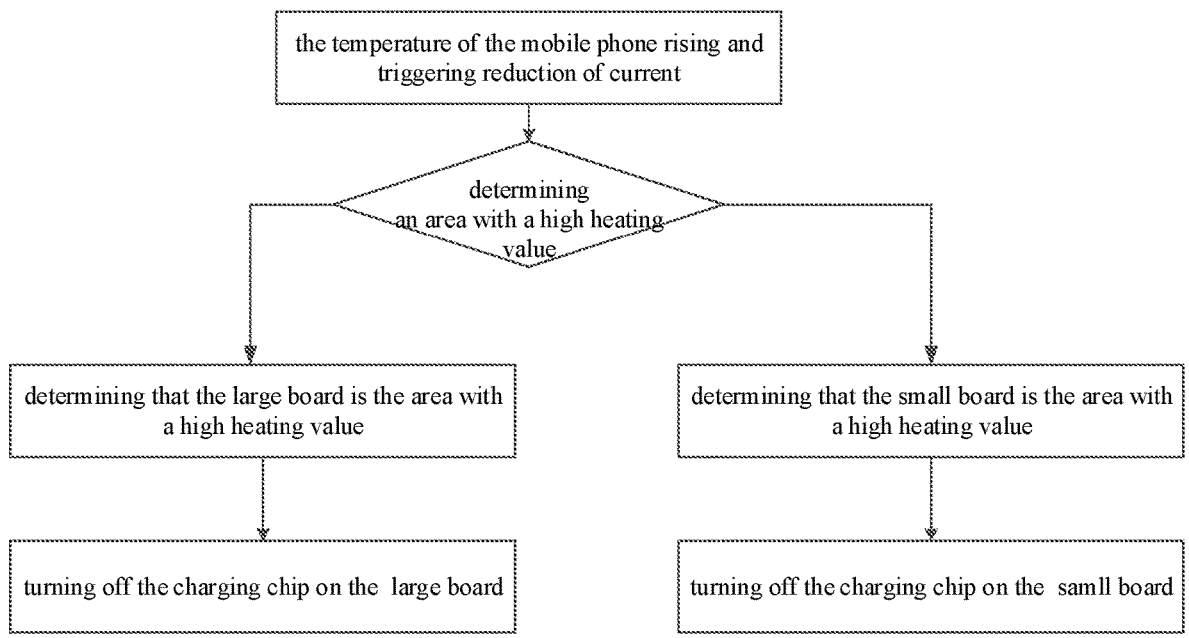
FIG. 3 is a flowchart of a method of charging the electronic device of FIG. 2 according to an embodiment of the present disclosure.

As illustrated in FIG. 3, each of the large board and the small board is provided with a charging chip. For the electronic device, taking the mobile phone as an example, both the large board and the small board have heat sources. When the temperature of the mobile phone rises, the charging control may trigger reduction of current. For example, in a case that the heat source of the large board is the CPU, and a corresponding scenario is, such as, charging while playing games, the temperature of the large board will rise and the large board will be hotter than the small board. At this time, the charging chip provided on the large board may be turned off and the charging chip provided on the small board may operate. In this way, the heat balance of the whole machine may be realized, a charging speed may be maximized and the heating value of the whole machine may be reduced. For another example, the heat source of the small board usually lies in backlight of a LCD screen and other heating devices on the small board. When the screen of the electronic device is at a maximum brightness, the temperature of the small board will rise and the small board will be hotter than the large board. At this time, the charging chip provided on the small board may be turned off and the charging chip of the large board may operate.

Figure 4:
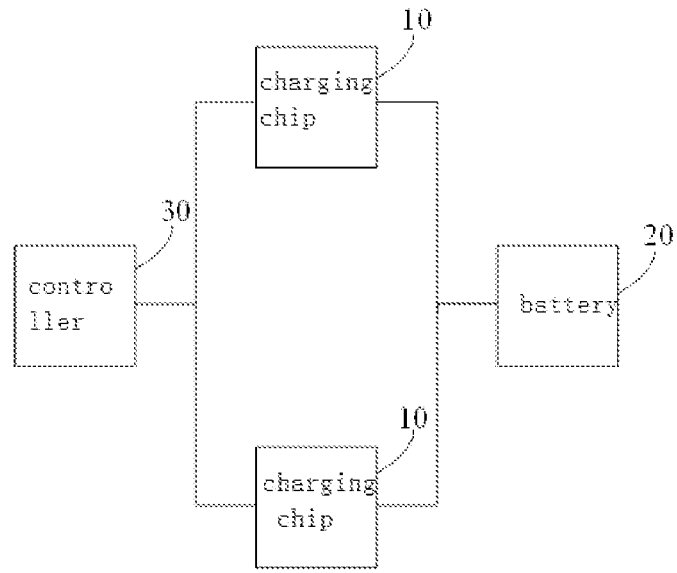
FIG. 4 is a block diagram of an electronic device according to another embodiment of the present disclosure.

Referring to FIG. 4, in some embodiments, the electronic device may also include a controller 30 connected with the plurality of charging chips 10. The controller 30 is configured to control operation or turn-off of the charging chips 10. The controller 30 may be provided on the mainboard, and may determine the charging chip 10 located at which positions to turn off according to the heating condition of the mainboard or the heating condition of the whole electronic device. Alternatively, the controller 30 may be a CPU of an electronic device. The controller 30 may independently collect the voltage information of the battery 20 according to the first voltage sampling end VBAT+ and the second voltage sampling end VBAT− of each charging chip 10, and determine whether to control multiple charging chips 10 to charge the battery simultaneously, or control a part of the charging chips 10 to charge the battery.

In some embodiments, when the electronic device includes one mainboard and the plurality of charging chips 10 are provided in different areas of the mainboard, the controller is configured to obtain temperatures of the different areas of the mainboard respectively, and control the operation or turn-off of the charging chips provided in different areas according to the temperatures of the different areas of the mainboard, That is, the controller 30 selectively turns off the charging chip 10 provided in the corresponding area according to the heating conditions of the different areas of the mainboard. For example, the mainboard is provided with a plurality of detection resistors, and the plurality of detection resistors are arranged in different areas of the mainboard. The controller 30 may determine the heating of the different areas of the mainboard according to a resistance value of each resistance, so as to control the charging chip 10 in the corresponding area to turn off.

In some embodiments, in a case that the electronic device includes the at least two mainboards and each mainboard is provided with at least one charging chip 10, the controller is configured to obtain temperatures of the at least two mainboards respectively, and control the operation or turn-off of the charging chips provided on the at least two mainboards according to the temperatures of the at least two mainboards. That is, the controller 30 may selectively turn off the charging chip 10 provided on the mainboard with large heating according to the heating condition of each mainboard. For example, each mainboard is provided with a detection resistor, and the controller 30 may determine the heating condition of each mainboard according to the resistance value of the detection resistor, so as to control the charging chip 10 on the corresponding mainboard to turn off.

For example, each of the large board and the small board are provided with one charging chip, and the electronic device takes the mobile phone as an example. Both the large board and the small board have heat sources. When the temperature of the mobile phone rises, the charging may trigger reduction of current. In the case that the heat source of the large board is the CPU and the corresponding scenario is charging while playing games, the temperature of the large board will rise, and the large board will be hotter than the small board. At this time, the controller 30 detects a change of the resistance value of the detection resistor on the large board, determines that the temperature the large board rises, and then control the charging chip provided on the large board to turn off and make the charging chip of the small board continue to work, so as to realize the heat balance of the whole machine, and reduce the heating of the whole machine. The heat source of the small board lies in the backlight of the LCD screen and other heating devices at the position of the small board. When a user turns the screen to the maximum brightness, the temperature of the small board will rise, and the small board will be hotter than the large board. At this time, the controller 30 detects a change of the resistance value of the detection resistor on the small board, and determines that the temperature of the small board rises, and then controls the charging chip on the small board to turn off and make the charging chip of the large board continue to operate, so as to realize the heat balance of the whole machine and reduce the heating of the whole machine.

In addition, in some embodiments, the operation or turn off of the charging chip provided on each mainboard may also be controlled according to the temperature of each mainboard and a preset temperature threshold.

In some embodiments, the electronic device may have a variety of different operating states, and running states of different applications in the electronic device may also be different. The controller may also be configured to determine the operating state of the electronic device and/or the running state of the application running on the electronic device, adjust the charging mode of the at least two charging chips according to the operating state of the electronic device and/or the running state of the application running on the electronic device, and control the operation or turn-off of the at least two charging chips respectively. The heating values of the mainboard of the electronic device are different due to different operating states or running states of the applications. Through the above settings, the charging chip provided on the mainboard with large heating may be turned off more accurately, and the temperature while charging may be controlled to adapt to different application scenarios, so as to reduce the heating of the whole machine and make the whole machine heat balanced.

Taking the electronic device including a large board and a small board, each of which is provided with a charging chip as an example, different applications will have a corresponding relationship with the large board or small board. The controller may control the charging chip on the associated large board or small board to turn off according to the large board or small board associated with different applications.

For example, because the large board is provided with heating elements such as CPU, the temperature of the large board will rise when users charging the electronic device while playing games, and the large board will be hotter than the small board. The controller detects that the temperature of the large board rises, so as to control the charging chip on the large board to turn off and let the charging chip on the small board continue to operate, so as to make the heat balance of the whole machine and reduce the heating of the whole machine. Because the small board is provided with LCD and other heating devices, when the user turns on the screen to the maximum brightness, the temperature of the small board will rise, and the small board will be hotter than the large board. The controller detects that the temperature of the small board is rise, and then control the charging chip on the small board to turn off and let the charging chip on the large board continue to operate, so as to realize the heat balance of the whole machine and reduce the heating of the whole machine.

For example, the charging mode of the charging chip may include a 1:1 charging mode and a 2:1 charging mode. The 1:1 charging mode means that, for example, a voltage input by the external power supply is 4.5V, which will be maintained at 4.5V output through the charging chip. The charging mode of 2:1 refers to that, for example, the voltage input by the external power supply is 9V, which will be reduced to 4.5V output through the charging chip. Because the 2:1 charging mode needs to receive a large voltage input by the external power supply, the charging efficiency is higher, but the heating value is relatively large.

For example, after the charging current is less than a certain value, for example, after the charging current is less than 6 A, when the electronic device is in charging and in the screen-off state, the heating of the whole machine is small. The charging chip on the large board and the charging chip on the small board may operate simultaneously to charge the battery, and the 2:1 charging mode may be adopted, for high charging efficiency. Although the 2:1 charging mode will generate some heat, since when the electronic device is in charging and in the screen-off state, the heating value of the whole machine is small, so the 2:1 charging mode will not increase too much heat of the whole machine.

When the electronic device is running the game and the brightness of the screen is less than a preset value, the screen will generate heat slightly. Therefore, the charging mode may be adjusted to the 1:1 charging mode. Although it will affect the charging efficiency, the heating value of the 1:1 charging mode is small, and the whole machine may still be controlled in a situation with small heating.

When the electronic device is running the game and the brightness of the screen is greater than the preset value, the power consumption is large. Therefore, the charging mode may be adjusted to the 2:1 charging mode to improve the charging efficiency. However, in this state, the heating value of the screen is large. In order to reduce the heating value of the whole machine, the charging chip provided on the small board may be turned off and the charging chip provided on the large board may be performing charging, so as to reduce the heating value of the whole machine.

Figure 5:
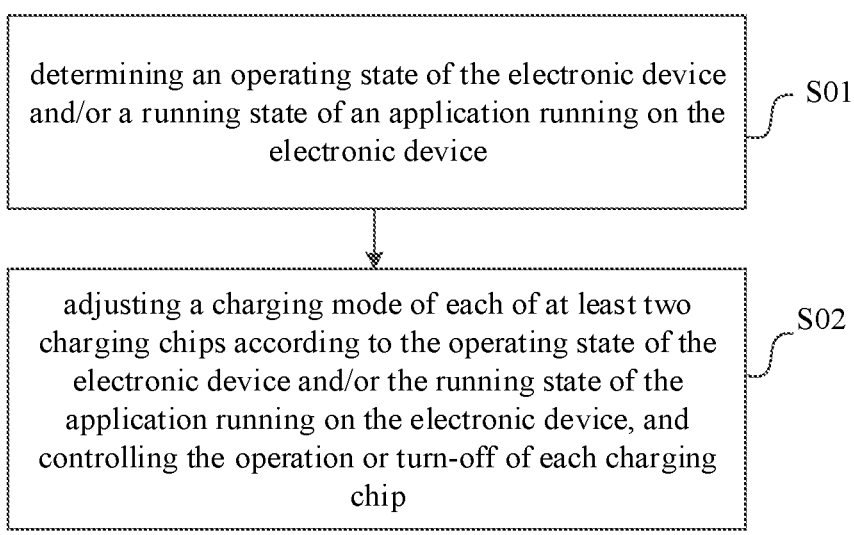
FIG. 5 is a flowchart of a charging control method according to an embodiment of the present disclosure.

Referring to FIG. 5, embodiments of the present disclosure provides a charging control method, which may be applied to the electronic device described in the above embodiments and implements. The control method includes the following blocks.

At block S01: at least one of an operating state of the electronic device and a running state of an application running on the electronic device is determined;

At block S02: a charging mode of each of at least two charging chips is adjusted according to at least one of the operating state of the electronic device and the running state of the application running on the electronic device, and the operation or turn-off of each charging chip is controlled.

Heating values of the mainboard of the electronic device are different due to different operating states or running states of the application. Through the above control method, the charging chip provided on the mainboard with a large heating value may be turned off more accurately, so as to reduce the heating of the whole machine and make the whole machine heat balanced.

In some embodiments, adjusting the charging mode of each of the at least two charging chips according to at least one of the operating state of the electronic device and the running state of the application running on the electronic device, and control the operation or turn-off of each charging chip may include the following situations.

(1) In a case that the operating state of the electronic device is in a screen-off state, the at least two charging chips are adjusted to a first charging mode, and the at least two charging chips are respectively controlled to operate.

When a screen is off, charging the battery causes small heating of the whole machine. Therefore, all charging chips may be controlled to operate.

(2) In a case that the operating state of the electronic device is that a brightness of a screen is less than a preset value, and a preset application is running, the at least two charging chips are adjusted to a second charging mode, and the at least two charging chips are respectively controlled to operate.

A charging current of the second charging mode is less than a maximum charging current of the first charging mode. That is, a heating value generated in the second charging mode will be less than a heating value generated in the first charging mode. For example, the first charging mode is 2:1 charging mode and the second charging mode is 1:1 charging mode. When the electronic device is in the operating state and the brightness of the screen is less than the preset value, the screen will heat slightly. Adjusting the charging mode to the second charging mode may appropriately reduce the heating value and maintain heat balance of the whole machine.

(3) In a case that the operating state of the electronic device is that the brightness of the screen is greater than or equal to the preset value, and the preset application is running, the at least two charging chips are adjusted to the first charging mode, a charging chip associated with the preset application is controlled to turn off, and other charging chips other than the charging chip associated with the preset application are controlled to operate.

Since the operating state of the electronic device is that the brightness of the screen is greater than or equal to the preset value, and the preset application is running which causes power consumption is large, the charging mode is adjusted to the first charging mode. However, the heating value in this state is large, so turning off the charging chip associated with the preset application and keeping other charging chips other than the charging chip associated with the preset application operating may reduce the heating value of the mainboard associated with the preset application, so as to reduce the heating value of the whole machine and maintain the heat balance of the whole machine.

Those skilled in the art easily think of other embodiments of the present disclosure after considering the description and practicing the disclosure disclosed herein. This disclosure is intended to cover any variations, uses, or adaptive changes that follow the general principles of this disclosure and include common general knowledge or customary technical means in the technical field not disclosed in this disclosure. The description and examples are to be considered exemplary only, and the true scope and spirit of this disclosure are disclosed by the claims.

It should be understood that the present disclosure is not limited to the precise structure that has been described above and shown in the drawings, and various modifications and changes can be made without departing from the scope thereof. The scope of the present disclosure is limited only by the appended claims.

What is claimed is:

1. A charging circuit, comprising at least two charging chips for charging a battery, wherein, each of the at least two charging chips is configured to operate in an independent charging mode;
    each charging chip comprises a first voltage sampling end and a second voltage sampling end for collecting voltage information of the battery, and each charging chip is configured for independent charging according to the collected voltage information, wherein the first voltage sampling end and the second voltage sampling end are respectively connected to two poles of the battery;
    each charging chip comprises a voltage input wire and a voltage output wire, the voltage input wire is configured for connecting with an external power supply, and the voltage output wire is configured for connecting with the battery;
    each charging chip comprises a first switch tube and at least one charging path, each charging path is provided with a capacitor, and each charging path is formed by a plurality of switch tubes connected in series;
    a first end of each charging path is connected to a first end of the first switch tube, and a second end of each charging path is grounded; the voltage input wire is connected to a second end of the first switch tube; the voltage output wire is connected to a node formed between any two switch tubes of each charging path.

2. The charging circuit according to claim 1, wherein the at least one charging path comprises a first charging path and a second charging path, the first charging path is provided with a first capacitor, and the second charging path is provided with a second capacitor;
    the first charging path comprises a second switch tube, a third switch tube, a fourth switch tube and a fifth switch tube connected in series successively, and the second charging path comprises a sixth switch tube, a seventh switch tube, an eighth switch tube and a ninth switch tube connected in series successively;
    a first end of the first capacitor is connected to a node formed between the second switch tube and the third switch tube, and a second end of the first capacitor is connected to a node formed between the fourth switch tube and the fifth switch tube;
    a first end of the second capacitor is connected to a node formed between the sixth switch tube and the seventh switch tube, and a second end of the second capacitor is connected to a node formed between the eighth switch tube and the ninth switch tube;
    the voltage output wire is connected to a node formed between the third switch tube and the fourth switch tube and a node formed between the seventh switch tube and the eighth switch tube.

3. An electronic device, comprising a battery and at least two charging chips for charging the battery, wherein each of the at least two charging chips is configured to operate in an independent charging mode;
    each charging chip comprises a first voltage sampling end and a second voltage sampling end for collecting voltage information of the battery, and each charging chip is configured for independent charging according to the collected voltage information, wherein the first voltage sampling end and the second voltage sampling end are respectively connected to two poles of the battery;
    the electronic device further comprising a controller configured to:
    determine an operating state of the electronic device;
    in a case that an operating state of the electronic device is in a screen-off state, adjust the at least two charging chips to a first charging mode, and respectively control the at least two charging chips to operate.

4. The electronic device according to claim 3, comprising:
    a mainboard, wherein the respective charging chips are provided on the main board; or
    at least two mainboards, wherein the respective charging chips are provided on a same mainboard in the at least two mainboards; or
    at least two mainboards, wherein each mainboard is provided with at least one charging chip.

5. The electronic device according to claim 4, comprising two charging chips and two mainboards comprising a large board and a small board, the large board is provided with one of the two charging chips, and the small board is provided with the other one of the two charging chips.

6. The electronic device according to claim 3, comprising a controller, and further comprising at least two mainboards, and each mainboard is provided with at least one charging chip, wherein
    the controller is configured to obtain temperatures of the at least two mainboards respectively, and control operation or turn-off of the charging chips provided on the at least two mainboards according to the temperatures of the at least two mainboards.

7. The electronic device according to claim 3, comprising a controller, and further comprising a mainboard, wherein the at least two charging chips are respectively provided in different areas of the mainboard,
the controller is configured to obtain temperatures of the different areas of the mainboard respectively, and control operation or turn-off of the charging chips provided in the different areas according to the temperatures of the different areas of the mainboard.

8. The electronic device according to claim 3, further comprising a controller, wherein the controller is configured to,
determine at least one of an operating state of the electronic device and a running state of an application running on the electronic device;
adjust a charging mode of each of the at least two charging chips according to at least one of the operating state of the electronic device and the running state of the application running on the electronic device, and control the operation or turn-off of each charging chip.

9. A charging control method, applicable for an electronic device comprising a battery and at least two charging chips for charging the battery, wherein each of the at least two charging chips is configured to operate in an independent charging mode, and the control method comprising:
determining at least one of an operating state of the electronic device and a running state of an application running on the electronic device; and
adjusting a charging mode of each of at least two charging chips according to at least one of the operating state of the electronic device and the running state of the application running on the electronic device, and control the operation or turn-off of each charging chip;
wherein adjusting the charging mode of each of the at least two charging chips according to at least one of the operating state of the electronic device and the running state of the application running on the electronic device, and control the operation or turn-off of each charging chip comprises:
in a case that the operating state of the electronic device is in a screen-off state, adjusting the at least two charging chips to a first charging mode, and respectively controlling the at least two charging chips to operate.

10. The control method according to claim 9, wherein adjusting the charging mode of each of the at least two charging chips according to at least one of the operating state of the electronic device and the running state of the application running on the electronic device, and control the operation or turn-off of each charging chip comprises:
in a case that the operating state of the electronic device is that a brightness of a screen is less than a preset value, and a preset application is running, adjusting the at least two charging chips to a second charging mode, and respectively controlling the at least two charging chips to operate, wherein a charging current of the second charging mode is less than a maximum charging current of the first charging mode.

11. The control method according to claim 9, wherein adjusting the charging mode of each of the at least two charging chips according to at least one of the operating state of the electronic device and the running state of the application running on the electronic device, and control the operation or turn-off of each charging chip comprises:
in a case that the operating state of the electronic device is that the brightness of the screen is greater than or equal to a preset value, and a preset application is running, adjusting the at least two charging chips to the first charging mode, control a charging chip associated with the preset application to turn off, and other charging chips other than the charging chip associated with the preset application to operate.

12. The control method according to claim 9, comprising:
collecting voltage information of the battery by a first voltage sampling end and a second voltage sampling end of each charging chip;
performing, by each charging chip, independent charging, according to the collected voltage information, wherein the first voltage sampling end and the second voltage sampling end are respectively connected to two poles of the battery.

13. The control method according to claim 12, wherein the electronic device comprises at least two mainboards, each mainboard is provided with at least one charging chip, and the method comprises:
obtaining temperatures of the at least two mainboards respectively;
controlling operation or turn-off of the charging chips provided on the at least two mainboards according to the temperatures of the at least two mainboards.

14. The control method according to claim 12, wherein the electronic device comprises a mainboard, the at least two charging chips are respectively provided in different areas of the mainboard, and the method comprising:
obtaining temperatures of the different areas of the mainboard respectively;
controlling operation or turn-off of the charging chips provided in the different areas according to the temperatures of the different areas of the mainboard.

15. The electronic device according to claim 4, comprising a controller, wherein the controller is configured to,
determine at least one of an operating state of the electronic device and a running state of an application running on the electronic device;
adjust a charging mode of each of the at least two charging chips according to at least one of the operating state of the electronic device and the running state of the application running on the electronic device; and
control the operation or turn-off of each charging chip.

* * * * *